(12) United States Patent
Evans et al.

(10) Patent No.: US 8,637,807 B2
(45) Date of Patent: Jan. 28, 2014

(54) APPARATUS AND METHODS FOR MEASURING FORMATION CHARACTERISTICS

(75) Inventors: Michael Evans, Missouri City, TX (US); Christian Stoller, Princeton Junction, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 535 days.

(21) Appl. No.: 12/837,450

(22) Filed: Jul. 15, 2010

(65) Prior Publication Data

US 2011/0012015 A1 Jan. 20, 2011

(30) Foreign Application Priority Data

Jul. 16, 2009 (EP) ..................................... 09165721

(51) Int. Cl.
*G01V 5/14* (2006.01)
(52) U.S. Cl.
USPC ...................................................... 250/269.2
(58) Field of Classification Search
USPC ...................................................... 250/269.2
See application file for complete search history.

(56) References Cited

U.S. PATENT DOCUMENTS

| | | | |
|---|---|---|---|
| 2,345,119 A | | 3/1944 | Hare |
| 3,073,958 A | * | 1/1963 | Youmans ....................... 250/262 |
| 3,566,117 A | * | 2/1971 | Tixier ............................ 250/264 |
| 3,789,219 A | | 1/1974 | Wilson |
| 4,439,675 A | | 3/1984 | Campbell |
| 4,879,463 A | * | 11/1989 | Wraight et al. ............. 250/269.2 |
| 7,073,378 B2 | * | 7/2006 | Smits et al. ................. 73/152.14 |
| 2006/0192096 A1 | | 8/2006 | Radtke |

\* cited by examiner

*Primary Examiner* — Constantine Hannaher
(74) *Attorney, Agent, or Firm* — Stephanie Chi; Brigitte Jeffrey Echols (57) ABSTRACT

An apparatus can measure characteristics of a formation surrounding a borehole. The apparatus includes a tool body having a neutron measurement section. The neutron measurement section includes a neutron source and a neutron detector arrangement spaced in an axial direction from the neutron source The apparatus also includes a density measurement section having a gamma ray source and a gamma ray detector arrangement spaced in an axial direction from the gamma ray source. The neutron measurement section and the density measurement section are positioned in the tool body so that the sections overlap in the axial direction and are azimuthally spaced apart in the tool body. The tool body also includes shielding to block a direct signal path from the neutron source to the gamma ray detector arrangement and to block a direct signal path from the gamma ray source to the neutron detector arrangement.

4 Claims, 6 Drawing Sheets

APPARATUS AND METHODS FOR MEASURING FORMATION CHARACTERISTICS

TECHNICAL FIELD

This invention relates to apparatus and methods for measuring properties of formations surrounding a borehole. In particular the invention relates to apparatus for measuring properties such as density and/or porosity of the formation surrounding boreholes of the type used in the oil and gas industry.

BACKGROUND ART

A number of techniques and apparatus are known for characterising the properties of the formation surrounding boreholes. Typically a tool body, comprising a signal source and sensors, is placed in the borehole and the source used to interrogate the formation. A signal returning to the tool body is measured and the parameter of interest calculated. WO96/08733 and U.S. Pat. No. 5,608,215 disclose neutron-neutron and neutron-gamma techniques for determining the density of a formation.

One well known suite of measurements is known as the 'triple combo' and is implemented using a measurement tool capable of measuring formation resistivity, porosity and density (and natural gamma ray) properties, and potentially several ancillary measurements.

Typical triple combo measurements arrange the devices for taking measurements in a vertical sequence along the tool body. In many cases a resistivity measurement device (induction, propagation, laterolog etc) is located at the bottom of the tool string, with a neutron measurement device following above. A natural gamma ray detector of the tool is located in such a way that it is not influenced by activation from a leading neutron source. One example of a known wireline triple combo tool is from Schlumberger and comprises a Dual Induction Tool (DIT) measuring resistivity, a Litho Density Tool (LDT) measuring gamma ray density, and a Compensated Neutron Tool (CNT) measuring porosity.

Locating the different sections down the tool increases the length of the tool. Reducing the length of the tool reduces the distance between measurements which helps in the interpretation of results and also reduces the time for rig up and rig down, and can help reduce the risk of the tool getting stuck in the wellbore. One example of a shorter wireline tool with similar capabilities is the Platform Express tool of Schlumberger which utilises integration of the structure of the various functional sections to achieve shorter overall length. Platform Express tools comprise an Array Induction Tool (AIT), a Three Detector Lithology Density tool (TLD), a Highly Integrated Gamma Ray Neutron Sonde (HGNS). A Micro Cylindrically Focused Log(MCFL) for shallow resistivity is co-located with a High Resolution Resistivity Gamma Detector (HRGD) for density measurement in a pad.

U.S. Pat. No. 7,073,378 describes a tool having a resistivity measurement device comprising a multiplicity of antennae interleaved with a neutron measurement device to reduce the length of the tool.

In logging while drilling (LWD) tools certain measurement sections have been co-located in a single collar, for example, the Compensated Density Neutron (CON) tool and Azimuthal Density Neutron (ADN) tool of Schlumberger.

The axial separation of the different measurement sections means that the investigation of all the formation properties cannot take place during the same time interval. This means that there can be changes in the formation properties (invasion, damage), the borehole (mud weight, borehole size, rugosity) or the tool position in the borehole (standoff) between the multiple measurements.

This invention aims to provide techniques for locating the various measurements closer together such that the interpretation of the measurements can be simpler and more accurate.

SUMMARY

This invention provides an apparatus for measuring characteristics of a formation surrounding a borehole comprising:
a tool body including:
a neutron measurement section including a neutron source and a neutron detector arrangement spaced in an axial direction from the neutron source; and
a density measurement section including a gamma ray source and a gamma ray detector arrangement spaced in an axial direction from the gamma ray source;
wherein the neutron measurement section and the density measurement section are positioned in the tool body so that the sections overlap in the axial direction and are azimuthally spaced apart in the tool body; and wherein the tool body also includes shielding to block a direct signal path from the neutron source to the gamma ray detector arrangement and to block a direct signal path from the gamma ray source to the neutron detector arrangement. The term gamma-ray includes x-rays and comprises any photons with energy >1 keV.

In one embodiment, the neutron measurement section and density measurement section are located on opposite sides of the tool body. In another embodiment, the neutron measurement section and the gamma ray measurement section are located to one side of the centre line of the tool. In this case, the direct line path between the two measurement sections does not pass through the tool centre line. Where the tool body includes a channel for flow of drilling fluid, the measurement sections can be positioned so that the straight line path does not pass through the channel.

The shielding can comprise neutron shielding located adjacent the neutron source to block a direct neutron path to the gamma ray detector arrangement and gamma ray shielding located adjacent the gamma-ray source to block a direct gamma ray path to the neutron detector arrangement.

The gamma ray detection arrangement can be provided with shielding to reduce neutron-induced background. In addition, to the neutron detectors (thermal, epithermal or fast neutron), the neutron detection arrangement can comprise one or more gamma ray detectors provided with shielding, and optionally, focusing structures to reduce direct and indirect interference from the gamma ray section.

The neutron section can comprise shielding to block direct neutron transmission from the source to the neutron detector arrangement, and the gamma ray section can comprise shielding to block direct gamma ray transmission from the source to the gamma ray detector arrangement The neutron measurement section can comprise a plurality of gamma ray and neutron detectors, e.g. near and far gamma ray detectors and near and far spaced neutron detectors. The gamma ray measurement section can comprise a plurality of gamma-ray detectors, traditionally a long spaced gamma ray detector and a short spaced gamma ray detector.

In one embodiment the neutron source and the gamma ray source are located at substantially the same axial position in the tool body. Where the neutron source and the gamma ray source are axially spaced apart on the tool body, the gamma ray source can be axially closer to the gamma ray detector arrangement than the neutron source.

The neutron detector arrangement and the gamma ray detector arrangement can both extend in the same axial direction from their respective sources in one embodiment. In another embodiment, the neutron detector arrangement extends away from the neutron source in the opposite axial direction compared to that of the gamma ray detector arrangement from the gamma ray source.

The gamma ray source can comprise an x-ray source.

The neutron source can comprise a pulsed neutron source and the gamma ray or x-ray source can comprise a pulsed source.

Preferably the apparatus is mounted in a wire line logging tool or a logging while drilling tool.

Galvanic and/or ultrasonic sensors can be mounted along the same axial extent of the tool body as the neutron and gamma ray sections.

Where the tool body is a logging while drilling tool comprising stabiliser blades disposed around the body at the same axial position, electronics and power sources can be incorporated into one or more blades or in the chassis or collar below or adjacent to the blades A second aspect of the invention comprises a method for measuring characteristics of a formation surrounding a borehole using an apparatus according to the first aspect of the invention, comprising:
  emitting neutrons from the neutron source into the formation;
  emitting gamma rays from the gamma ray source into the formation;
  detecting neutrons and gamma rays returning to the neutron section from the formation resulting from irradiation of the formation with neutrons;
  detecting gamma rays returning to the gamma ray section from the formation resulting from the irradiation of the formation with gamma rays; and
  analyzing the detected gamma rays and neutrons to provide an indication of the characteristics of the formation.

Where the apparatus comprises a pulsed neutron source the method can comprise synchronizing the gamma ray measurement in the gamma ray section with operation of the pulsed neutron source. In one embodiment, this can comprise measuring the difference in the gamma ray measurements between the on and off periods of the pulsed neutron source. In this case, the measurements when the pulsed neutron source is one can be used to determine a neutron-induced background. In another embodiment, gamma ray measurement can be suspended when the pulsed neutron source is on. In a further embodiment, gamma ray measurements are time binned so that those measurements taken when the pulsed neutron source is on can be identified.

When the apparatus comprises a pulsed neutron generator and a pulsed x-ray source the method can further comprise disabling the x-ray source during the pulsing cycle of the pulsed neutron source.

In another embodiment, the method can comprise operating the pulsed x-ray source only when the pulsed neutron source is off.

Further aspects of the invention will be apparent from the following description.

DETAILED DESCRIPTION

Figure 1:
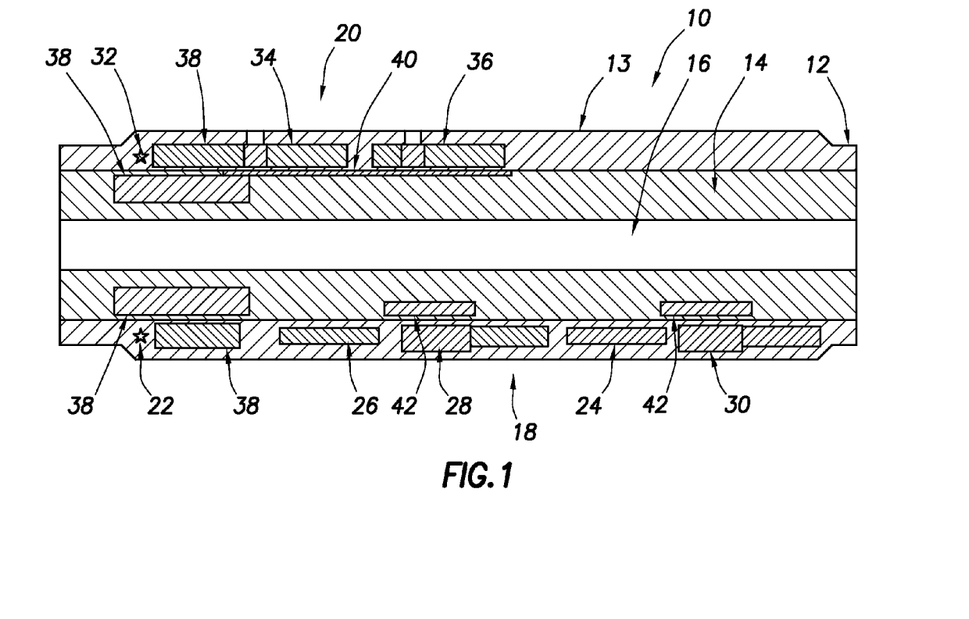
FIG. 1 shows a schematic drawing of a first embodiment of the invention.
Figure 2:
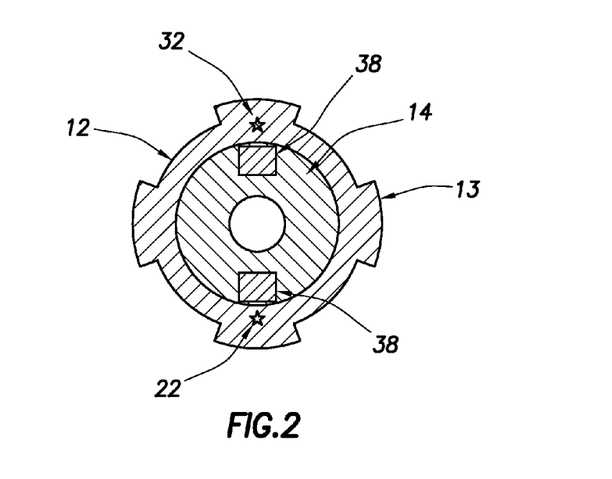
FIG. 2 shows a cross sectional view of FIG. 1.

FIGS. 1 and 2 show a representation of a borehole tool according to the invention. The tool 10 can form part of a drill string (not shown). The tool 10 comprises a collar 12 surrounding a chassis 14 that defines a mud channel 16. Stabilizer blades 13 may be mounted on the collar. The tool 10 comprises a neutron measurement section 18 and density (gamma ray) measurement section 20 mounted in the collar 12 under the stabilizer blades 13 on opposite sides of the tool. The neutron measurement section and density measurement section are azimuthally spaced apart on the tool body in the same axial plane, such that the two measurement sections overlap each other in the axial direction.

The neutron measurement section 18 comprises a neutron source 22, a pair of spaced apart neutron detectors comprising a far spaced neutron detector 24 and a near spaced neutron detector 26 and a pair of spaced apart gamma ray detectors, comprising a near spaced gamma detector 28 and a far spaced gamma detector 30. The neutron source 22 produces neutrons that are emitted towards the formation and are scattered back to the near and far neutron detectors 24, 26 mounted in the collar. The near and far spaced gamma detectors 28, 30 measure the gamma rays resulting from the neutron irradiation of the formation. The results of the measurements from the neutron detectors can be used to determine the neutron porosity of the formation using known methods.

The neutron source may be a chemical neutron source or a neutron generator source. An electronic neutron source can be based on d-T, d-d, t-t sources, i.e. a d-T 14 MeV source. Typically an electronic neutron source will be pulsed. Typical chemical neutron sources are $^{241}$AmBe and $^{252}$Cf. It is preferable to use $^{3}$He detectors as the neutron detectors, however other suitable detectors can also be used.

A neutron monitor detector (not shown) may be installed close to the electronic neutron source to measure the instantaneous and/or average neutron output.

The density measurement section 20 comprises a gamma ray source 32 and spaced gamma ray detectors 34, 36. Gamma rays are emitted from the gamma ray source towards the formation. The gamma rays are scattered back to the gamma detectors and detected by short spaced 34 and long spaced 36 detectors mounted in the collar of the tool. The gamma ray source and the neutron source are axially aligned and azimuthally spaced 180° apart.

A typical element for a chemical gamma ray source may be $^{137}$Cs. The detectors for the gamma rays may be scintillation detectors (NaI(Tl), LaBr$_3$, GSO etc) coupled to ruggedized photomultipliers or other amplification devices.

Shielding material 38 is provided in the collar 12 and chassis 14 to reduce the level of crosstalk between the two measurement sections 18, 20.

The axial overlap of the neutron detector device 18 and the gamma ray detector device 20 allows a tool to be achieved that is substantially shorter than those known from the prior art.

The shielding material 38 prevents the neutrons generated from the neutron source 22 and the gamma rays generated from the gamma ray source 32 from directly reaching the detectors 24, 26, 34, 36. Source shielding 38 is provided around the gamma ray and neutron sources 32, 22 to block direct irradiation of the detectors on the other side of the tool. Back shields 40 can be provided around the density detectors 34, 36, to shield the detectors from the impact of neutrons to reduce the neutron induced background. Additional measures may help to subtract the neutron induced background from the density signal. The gamma ray detectors 28, 30 in the neutron section may also have additional shielding 42 and focusing to reduce the background induced by the direct and indirect gamma rays from the density section.

By having the neutron and gamma ray measurement devices located close together in the same axial location, the interpretation of measurements is simpler and more accurate. In particular the collocation of the measurement devices allows the investigation of all the formations properties during the same time interval. This means that there is little or no change in the formation properties (i.e. invasion, damage), the borehole (i.e. mud weight, borehole size, rugosity) or the tool position in the borehole (standoff) between the multiple measurements being made.

Although the invention is exemplified using a gamma ray source to determine the density of the formation, the gamma ray source could be replaced with an x-ray source. Where an electronic x-ray source is used this will allow the pulsing of x-rays when irradiating the formation.

Figure 3:
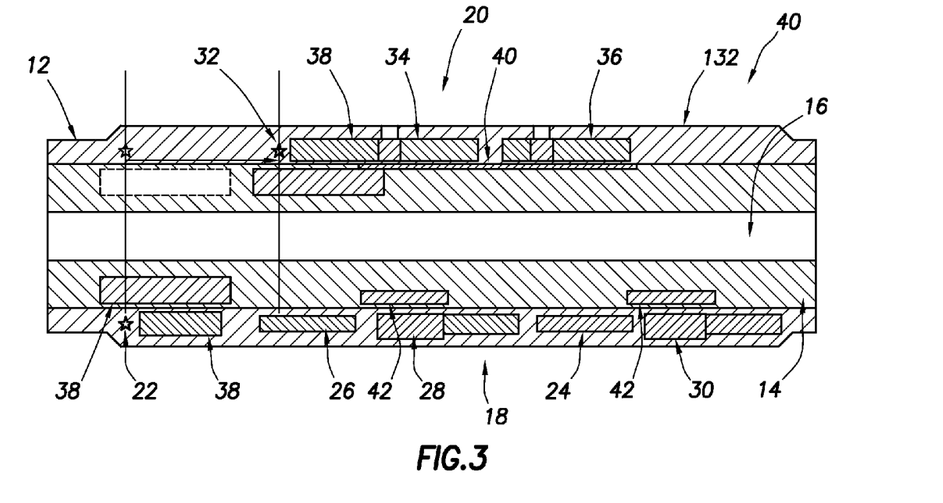
FIG. 3 shows a schematic drawing of a second embodiment of the invention.
Figure 4:
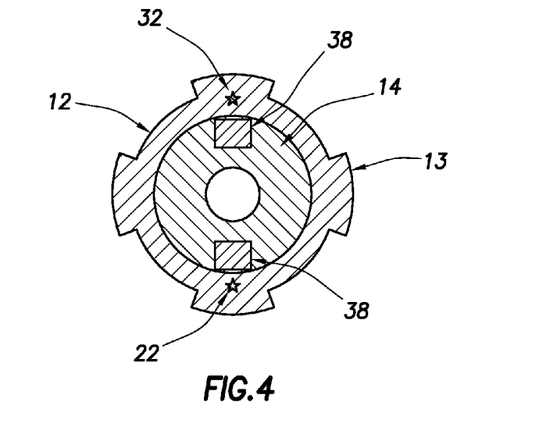
FIG. 4 shows a cross sectional view of FIG. 3.

It is not necessary that the two sources are precisely axially aligned. As shown in FIGS. 3 and 4 the tool comprises co-located neutron and density measurement sections with axially space apart neutron and gamma sources. The tool 40 comprises neutron measurement section 18 and the density measurement section 20 located on opposite sides of the collar 12. Compared to the embodiment in FIG. 1 the gamma ray source 32 and gamma detectors 34, 36 are shifted down the tool, such that the gamma source is no longer axially in line with the neutron source 22. The density measurement section 20 and the neutron measurement section 18 are still located in the same area of the tool body 10 and as such the two sections overlap each other. Positioning the gamma ray source so that it is not axially in line with the neutron source can help reduce the influence of the neutron radiation and the neutron induced gamma rays on the density measurements, compared to the embodiment where the gamma and neutron source are located at the same axial position on the tool.

Figure 5:
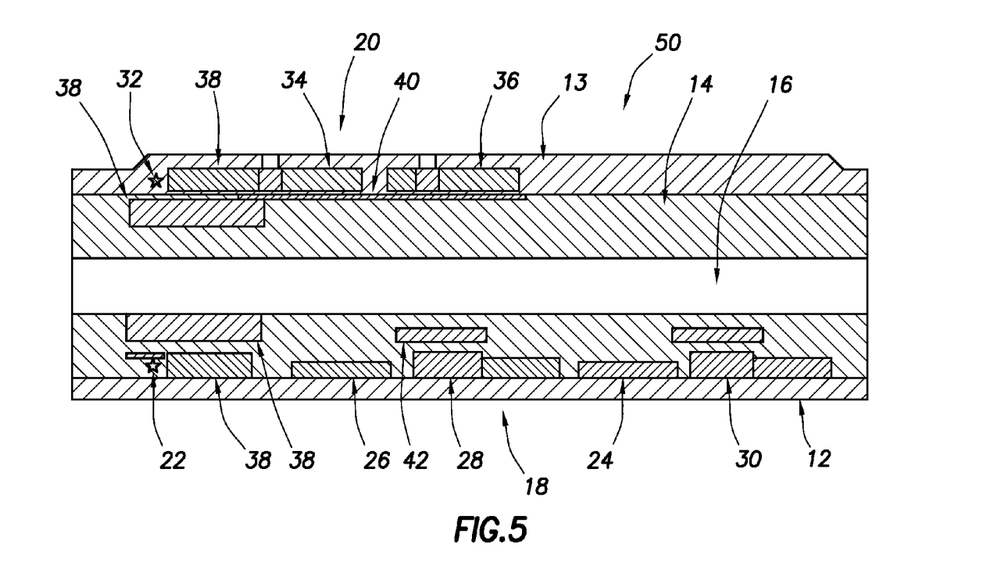
FIG. 5 shows a schematic drawing of a third embodiment of the invention.
Figure 6:
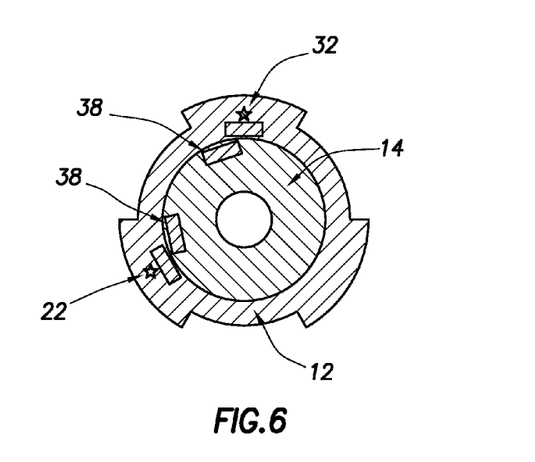
FIG. 6 shows a cross sectional view of FIG. 5.

It is not necessary that the two measurement sections are located on opposite sides of the collar. As shown in FIGS. 5 and 6 the measurement sections 18, 20 can be located at different azimuths. In this embodiment of the invention the neutron measurement section 18 and the density measurement section 20 are collocated at different azimuths about the tool body 50. The tool comprises the neutron measurement section 18 and the density measurement section 20 located axially in the same position but are located at different azimuths (both to one side of the tool centre line) about the tool compared to the embodiment of FIG. 1. By locating the measurements in the tool body such that they are not located opposite each other, the mud passage 16 can not provide such an easy passage for neutrons and gamma rays to pass directly from one measurement section to the other.

Figure 7:
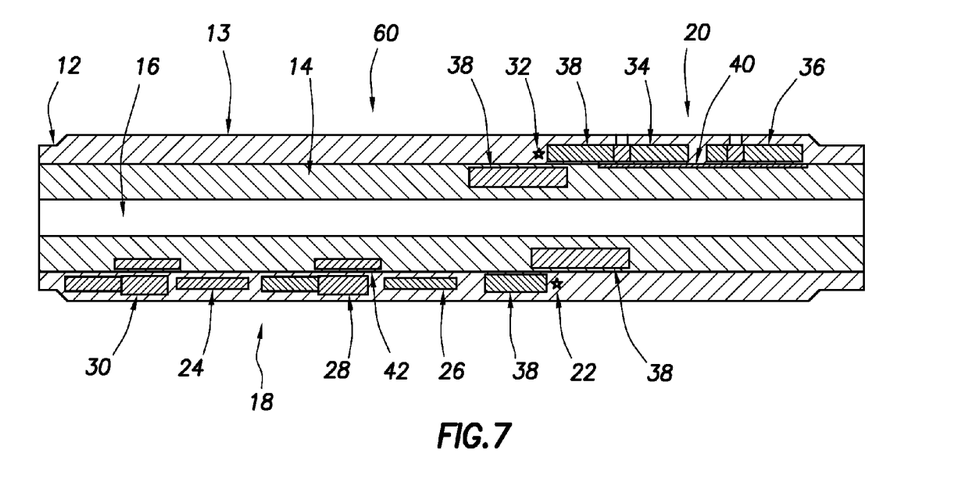
FIG. 7 shows a schematic drawing a fourth embodiment of the invention.
Figure 8:
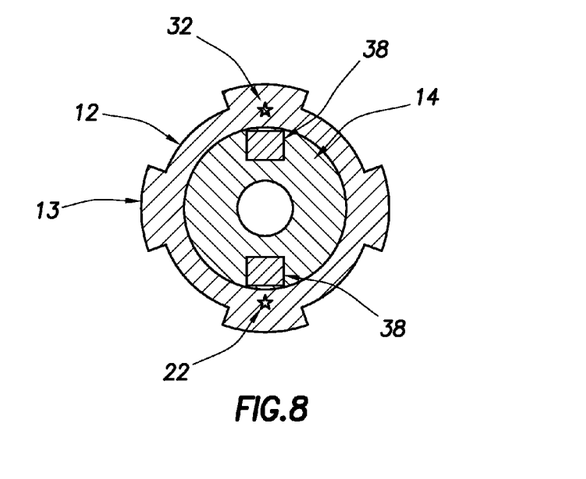
FIG. 8 shows a cross sectional view of FIG. 7.

In a further embodiment of the invention the measurement sections of the tool may be partially co-located as shown in FIGS. 7 and 8. The neutron 22 and gamma ray 32 sources of the measurement sections are located at substantially similar axial positions on opposite sides of the tool body 60 however the detecting sections are at opposing axial positions, so that only part of each measurement section overlaps the other measurement section.

Stabilizer blades may be mounted on the outer periphery of the tool and can provide improved contact between the tool and the formation. Electronics and power sources can be mounted into one or more blades. The PNG source comprises a high voltage supply, as can the pulsed x-ray source. These high voltage supplies can be incorporated into a separate stabilizer blade mounted on the tool to further help in minimising the length of the tool. The electronics and power sources can also be incorporated into the chassis or collar below or adjacent to the blades.

The tool may further include galvanic sensors. The galvanic sensors can be used to measure the resistivity of the formation and may be mounted on one or more of the stabilizers blades of the tool. Such galvanic sensors measure resistivity by applying a voltage differential across parts of the tool which will cause currents to flow from the tool and into the formation.

Propagation resistivity antennae may be mounted on the tool to overlay the neutron and/or gamma-ray measurement sections. Having the resistivity antennae overlap at least part of the neutron measurement section helps reduce the total length of the tool and may also allow simultaneous measurement of the formation using the neutron measurement device and the resistivity measurement device.

Additional sensors can be added to the collar without increasing its length. These include ultrasonic sensors to give a measurement of the tool stand off. Ultrasonic measurements are well known in the industry as a means to determine the tool stand off from the borehole wall. The tool stand off is determined by emitting an ultrasonic pulse from the tool and determining the time delay between the emission and the detection of the reflected signal (echo) in the tool. If the propagation velocity in the mud is known the tool stand off from the formation can be determined.

The apparatus can be incorporated into logging while drilling tools or wireline logging tools. For a logging while drilling operation the apparatus is attached to the drilling string to form a bottom hole drilling assembly between the drill string and a drill bit. Other LWD tools may also be attached to the drill string. As the drill string and the bottom hole assembly rotate, the drill bit bores a borehole through the formation. The density and neutron measurements at different azimuths can be obtained as the drill string and tool of the invention move through the formation.

Co-location of the density and neutron measurement sections on the tool can result in crosstalk. However, the amount of crosstalk can be reduced and/or better quantified where one or both of the sources are pulsed. By co-locating the measurement sections, it is not necessary to compensate for the different locations of the sources.

Where a pulsed neutron measurement is used with a chemical source ($^{137}$Cs) based density measurement the pulsed operation can be used to synchronize the measurements in time.

It is possible to measure the difference in the density count rates between the on and off periods of the pulse neutron generator (PNG), during the burst, during the decay of the capture gamma signal and during the burst off phase, by synchronizing the density acquisition with the neutron pulsing and acquiring the count rates for different time intervals with respect to the neutron timing. If the crosstalk during the neutron burst is too severe, the density measurement could be blocked during the burst period. The loss of duty factor may be more than compensated by the more accurate and precise background subtraction. Alternatively the density signal can be binned for the different PNG time gates and corrected separately. This makes it possible to assess the accuracy of the background subtraction and to exclude time bins from the measurement if necessary.

Where both the neutron source and the x-ray source are pulsed it is possible to measure the influence of the neutron induced background in the neutron measurement directly by using a well coordinated pulsing scheme. In this situation the x-ray source can be disabled periodically during an entire PNG pulsing cycle. During this time only the crosstalk signal from the neutron measurement is acquired. This determined background can be subtracted from the density window count rates. Fast x-ray pulsing can done in such a way to acquire the density signal only while the neutron generator is not emitting neutrons, alternatively the density acquisition can be gated to be turned off during the neutron burst.

Figure 9:
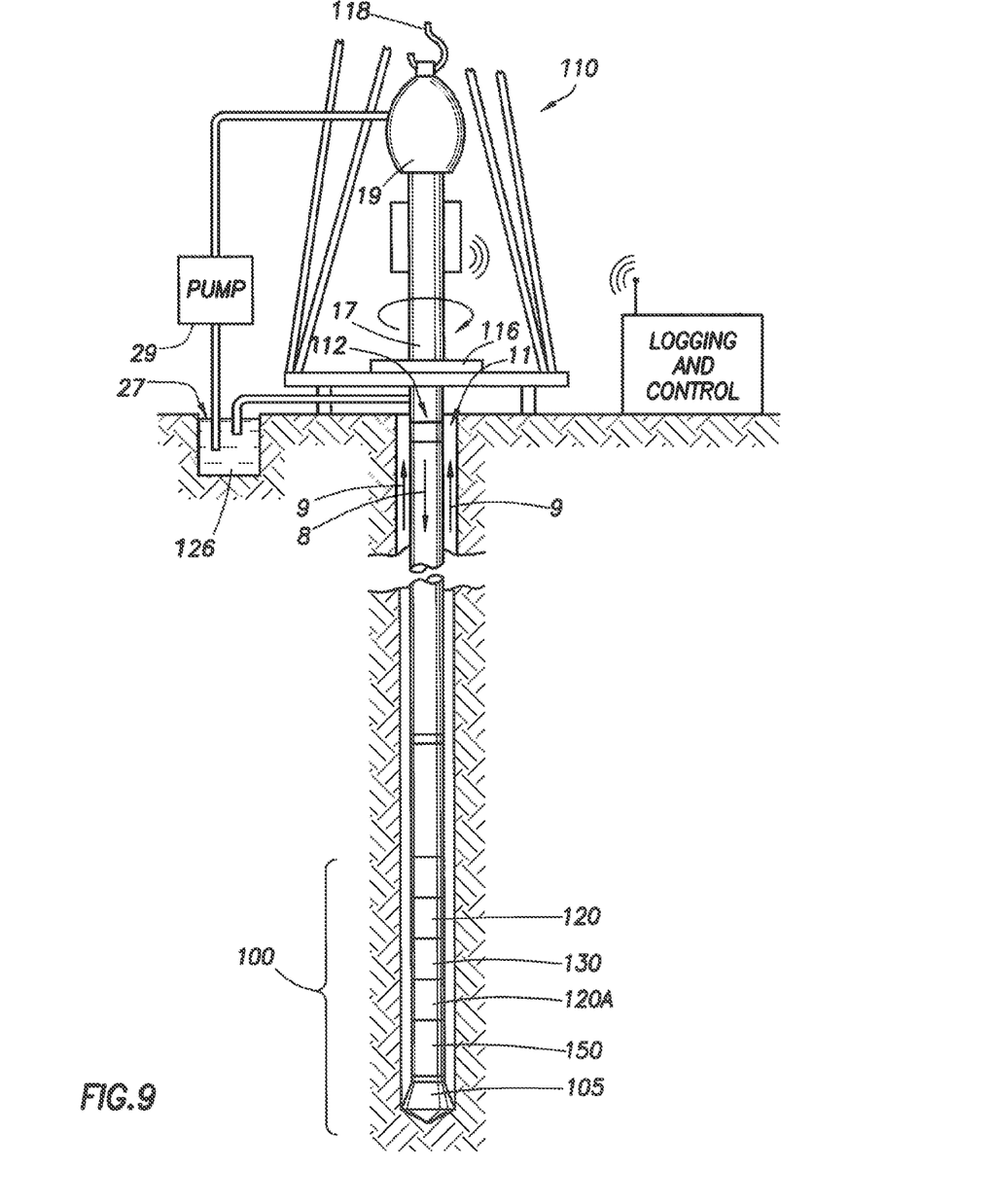
FIG. 9 shows an example of a drilling rig platform for implementing an embodiment of the invention.

FIG. 9 illustrates a wellsite system in which the present invention can be employed. The wellsite can be onshore or offshore. In this exemplary system, a borehole 11 is formed in subsurface formations by rotary drilling in a manner that is well known. Embodiments of the invention can also use directional drilling, as will be described hereinafter.

A drill string 112 is suspended within the borehole 11 and has a bottom hole assembly 100 which includes a drill bit 105 at its lower end. The surface system includes platform and derrick assembly 110 positioned over the borehole 11, the assembly 110 including a rotary table 116, kelly 17, hook 118 and rotary swivel 19. The drill string 112 is rotated by the rotary table 116, energized by means not shown, which engages the kelly 17 at the upper end of the drill string. The drill string 112 is suspended from a hook 118, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 112 via a port in the swivel 19, causing the drilling fluid to flow downwardly through the drill string 112 as indicated by the directional arrow 8. The drilling fluid exits the drill string 112 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment comprises a logging-while-drilling (LWD) module 120, a measuring-while-drilling (MWD) module 130, a roto-steerable system and motor 150, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a nuclear measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

Figure 10:
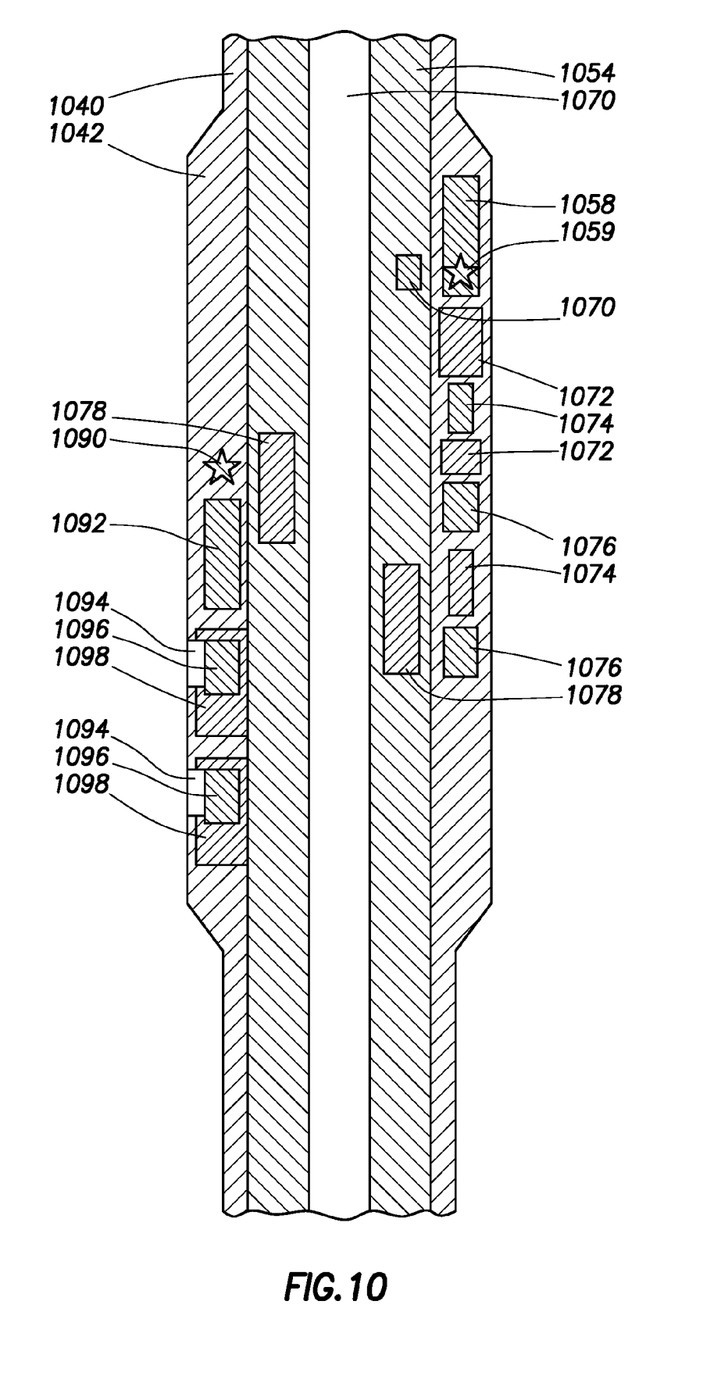
FIG. 10 shows a LWD tool for implementing an embodiment of the invention.

FIG. 10 shows a logging while drilling device as disclosed in this application, which uses an accelerator-based source, it being understood that other types of LWD tools can be used as the LWD tool 120 or part of an LWD suite 120A. In FIG. 10 a drill collar section 1040 with stabilizer 1042 is shown as surrounding a tool chassis 1054 traversed by a mud channel 1070 for conveying the drilling fluid downward through the drill string. The stabilizer on the left incorporates a gamma-gamma density measurement consisting of source 1090, shielding 1092, detector windows 1094, detectors 1096 and detector shielding 1098. The stabilizer on the right incorporates an accelerator-based neutron measurement as disclosed in this application. The measurement consists of a neutron generator 1058 with the neutron emitting target 1059, neutron-gamma shielding 1072, neutron detectors 1074 and gamma-ray detectors 1076. A neutron monitor 1070 is used to normalize the output of other detectors for source strength. The measurement can be used to determine formation porosity, density, lithology and sigma. U.S. Pat. No. 7,334,465 incorporated herein by reference, can be referred to for further reference. Shielding 1078 is provided between the two measurements to reduce or eliminate crosstalk between the measurements.

Further embodiments within the scope of the invention will be apparent.

The invention claimed is:

1. A method for measuring characteristics of a formation surrounding a borehole using an apparatus comprising a pulsed neutron source, wherein the method comprises:
    emitting neutrons from the neutron source into the formation;
    emitting gamma rays from the gamma ray source into the formation;
    detecting neutrons and gamma rays returning to the neutron section from the formation resulting from irradiation of the formation with neutrons;
    detecting gamma rays returning to the gamma ray section from the formation resulting from the irradiation of the formation with gamma rays;
    synchronizing the gamma ray measurement in the gamma ray section with operation of the pulsed neutron source;
    measuring the difference in gamma ray measurements between the on and off periods of the pulsed neutron source; and
    analyzing the detected gamma rays and neutrons to provide an indication of the characteristics of the formation.

2. A method as claimed in claim 1, wherein the measurements when the pulsed neutron source is on are used to determine a neutron-induced background.

3. A method as claimed in claim 1, wherein gamma ray measurement are suspended when the pulsed neutron source is on.

4. A method as claimed in claim 1, wherein gamma ray measurements are time binned so that those measurements taken when the pulsed neutron source is on can be identified.

\* \* \* \* \*